(12) United States Patent
Martin et al.

(10) Patent No.: US 9,311,603 B2
(45) Date of Patent: *Apr. 12, 2016

(54) REAL TIME SAFETY MANAGEMENT SYSTEM AND METHOD

(71) Applicant: Invensys Systems, Inc., Foxboro, MA (US)

(72) Inventors: Peter G. Martin, Foxboro, MA (US); Steve Elliott, Worthing (GB); Ajay Mishra, Lake Forest, CA (US)

(73) Assignee: Invensys Systems, Inc., Foxboro, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/619,217

(22) Filed: Feb. 11, 2015

(65) Prior Publication Data

US 2015/0154496 A1 Jun. 4, 2015

Related U.S. Application Data

(63) Continuation of application No. 13/652,635, filed on Oct. 16, 2012, now Pat. No. 9,031,892.

(60) Provisional application No. 61/635,682, filed on Apr. 19, 2012.

(51) Int. Cl.
G06F 17/00 (2006.01)
G06F 17/20 (2006.01)
(Continued)

(52) U.S. Cl.
CPC *G06N 5/027* (2013.01); *G05B 9/02* (2013.01); *G06N 5/02* (2013.01); *G06Q 10/00* (2013.01); *Y04S 10/54* (2013.01)

(58) Field of Classification Search
USPC .......................................................... 706/11
See application file for complete search history.

(56) References Cited

U.S. PATENT DOCUMENTS 3,576,976 A    5/1971  Russo et al.
5,134,574 A    7/1992  Beaverstock et al.
(Continued)

FOREIGN PATENT DOCUMENTS

CN    101527029 A    9/2009
EP    1014287 A2    6/2000
(Continued)

OTHER PUBLICATIONS

Assessing Risk in Discrete Event Simulation by Generalized Deviation Koors, A. Modelling and Simulation (EUROSIM), 2013 8th EUROSIM Congress on Year: 2013 pp. 336-344, DOI: 10.1109/EUROSIM.2013.67 IEEE Conference Publications.*

(Continued)

*Primary Examiner* — Michael B Holmes
(74) *Attorney, Agent, or Firm* — Thomas J. Roth, Esq.

(57) ABSTRACT

A system and method assesses and manages risk of an operation of a user. A rules engine of computer executable instructions stored in the storage device determines at least one of a safety risk measurement based on key performance indicators, an operational safety risk measurement for the operation as a function of the operational safety risk measurement information stored in a storage device and/or a conditional safety risk measurement for the operation as a function of the conditional safety risk measurement information stored in the storage device. A processor connected to the storage device executes the rules engine. An output interface connected to the processor indicates the determined safety risk for the operation.

21 Claims, 13 Drawing Sheets

Real Time Safety Risk Measurement

(51) Int. Cl.
  *G06N 5/02* (2006.01)
  *G06Q 10/00* (2012.01)
  *G05B 9/02* (2006.01)

(56) References Cited

U.S. PATENT DOCUMENTS

| | | | |
|---|---|---|---|
| 5,521,814 | A | 5/1996 | Teran et al. |
| 5,684,945 | A | 11/1997 | Chen et al. |
| 6,038,540 | A | 3/2000 | Krist et al. |
| 6,151,601 | A | 11/2000 | Papierniak et al. |
| 6,219,805 | B1 | 4/2001 | Jones et al. |
| 6,285,966 | B1 | 9/2001 | Brown et al. |
| 6,317,701 | B1 | 11/2001 | Pyotsia et al. |
| 6,356,205 | B1 | 3/2002 | Salvo et al. |
| 6,449,715 | B1 | 9/2002 | Krivoshein |
| 6,529,780 | B1 | 3/2003 | Soergel et al. |
| 6,618,745 | B2 | 9/2003 | Christensen et al. |
| 6,631,305 | B2 | 10/2003 | Newmark |
| 6,633,782 | B1 | 10/2003 | Schleiss et al. |
| 6,725,182 | B2 | 4/2004 | Pagnano et al. |
| 6,742,000 | B1 | 5/2004 | Fantasia et al. |
| 6,795,798 | B2 | 9/2004 | Eryurek et al. |
| 6,816,747 | B2 | 11/2004 | Mammoser et al. |
| 6,859,755 | B2 | 2/2005 | Eryurek et al. |
| 7,162,312 | B2 | 1/2007 | Gross et al. |
| 7,363,193 | B2 | 4/2008 | Jacobs et al. |
| 7,366,273 | B2 | 4/2008 | Russell, II et al. |
| 7,480,536 | B2 | 1/2009 | Kaufman et al. |
| 7,533,798 | B2 | 5/2009 | Jones et al. |
| 7,644,005 | B1 | 1/2010 | Billiotte et al. |
| 7,685,029 | B2 * | 3/2010 | Martin ............ G06Q 10/0631 700/2 |
| 7,904,407 | B2 | 3/2011 | Chandler et al. |
| 8,005,690 | B2 | 8/2011 | Brown |
| 8,055,371 | B2 | 11/2011 | Sanford et al. |
| 8,156,017 | B2 * | 4/2012 | Martin ............ G06Q 10/0631 700/2 |
| 8,326,791 | B2 | 12/2012 | Howerton et al. |
| 8,346,694 | B2 | 1/2013 | Dugan et al. |
| 9,031,892 | B2 * | 5/2015 | Martin ............... G06N 5/02 706/47 |
| 9,137,222 | B2 * | 9/2015 | Haeger ............ H04L 63/061 |
| 2002/0133254 | A1 | 9/2002 | Elwood et al. |
| 2003/0037063 | A1 | 2/2003 | Schwartz |
| 2003/0060993 | A1 | 3/2003 | Russell et al. |
| 2003/0144932 | A1 | 7/2003 | Martin et al. |
| 2004/0128647 | A1 | 7/2004 | Gibbons |
| 2005/0007249 | A1 | 1/2005 | Eryurek et al. |
| 2005/0075970 | A1 | 4/2005 | Doyle |
| 2007/0106599 | A1 | 5/2007 | Hochberg et al. |
| 2008/0046268 | A1 | 2/2008 | Brown |
| 2009/0012631 | A1 | 1/2009 | Fuller |
| 2009/0070170 | A1 | 3/2009 | Krishnamurthy |
| 2009/0073171 | A1 | 3/2009 | Straub et al. |
| 2009/0093892 | A1 | 4/2009 | Kant et al. |
| 2010/0036702 | A1 | 2/2010 | Sitton |
| 2010/0076809 | A1 | 3/2010 | Eryurek et al. |
| 2011/0022554 | A1 | 1/2011 | Reckmann et al. |
| 2011/0066457 | A1 | 3/2011 | Chang et al. |
| 2011/0066589 | A1 | 3/2011 | Chang et al. |
| 2011/0066590 | A1 | 3/2011 | Chang et al. |
| 2011/0066898 | A1 | 3/2011 | McRory et al. |
| 2011/0125672 | A1 | 5/2011 | Rosenthal et al. |
| 2011/0131658 | A1 | 6/2011 | Bahl |
| 2013/0282641 | A1 * | 10/2013 | Martin ............... G06N 5/02 706/47 |
| 2015/0154496 | A1 * | 6/2015 | Martin ............... G06N 5/02 706/11 |

FOREIGN PATENT DOCUMENTS

| | | | |
|---|---|---|---|
| EP | 2317412 | A1 | 5/2011 |
| WO | 2011009009 | A1 | 1/2011 |

OTHER PUBLICATIONS

A formal approach for network security management based on qualitative risk analysis Rahman, M.A.; Al-Shaer, E. Integrated Network Management (IM 2013), 2013 IFIP/IEEE International Symposium on Year: 2013 pp. 244-251 IEEE Conference Publications.*

Risk assessment of real time digital control systems Hecht, M.; Buettner, D.; Hellrung, J. Reliability and Maintainability Symposium, 2006. RAMS '06. Annual Year: 2006 pp. 409-415, DOI: 10.1109/RAMS.2006.1677409 IEEE Conference Publications.*

Posterior analysis in assessing risk of extreme events: a conjugate family approach Pannullo, J.E.; Duan Li; Haimes, Y.Y. Systems, Man and Cybernetics, 1993. 'Systems Engineering in the Service of Humans', Conference Proceedings., International Conference on Year: 1993 pp. 477-482 vol. 1, DOI: 10.1109/ICSMC.1993.384789.*

* cited by examiner

Real-Time Profit Control

Constrained Real-Time Profitability Model

| Corporate Value at Risk | | 15.1 | 49.5 | 4.95 |
|---|---|---|---|---|
| Plant | SPI | Inc. Asset at Risk $M | Inc. Prod. at Risk kB/d | Inc. Rev. at Risk $M |
| NA-P1 | 89% | 10 | 30 | 3 |
| NA-P2 | 90% | 3 | 10 | 1 |
| EU-P3 | 96% | 0.1 | 1 | 0.1 |
| ME-P4 | 90% | 2 | 8 | 0.8 |
| AP-P5 | 100% | 0 | 0.5 | 0.05 |

FIG. 12

# REAL TIME SAFETY MANAGEMENT SYSTEM AND METHOD

BACKGROUND

Safety of people, equipment, facilities and the environment is becoming increasingly important in industrial operations. This is not just because of the highly publicized accidents that have occurred over the past few years, or even for altruistic reasons. Rather, it has becoming evident that the safety of an operation is directly linked to its profitability. Industrial executives are very concerned over the safety and operational integrity of their operations, recognizing that increased profitability potential that is realized through more effective safety management that is really starting to turn heads.

For decades industrial professionals have recognized that the cost of an unexpected event, such as an explosion, is very high in terms of injury, loss of life, equipment damage, facility damage, environmental damage, business interruption, brand recognition and stock value and insurance. Industry has responded to this high cost through functional safety programs, such as installing safety instrumented systems to detect pending unsafe conditions and automatically taking the correct response. These systems have proven to be very effective at the avoidance of predefined unsafe events and certainly represent a huge step forward. But cost avoidance of unexpected events represents a small piece of the overall potential profitability impact that results from an effective safety control solution. The "cost avoidance" perspective tends to be easy for business executives to ignore because they are lulled into believing that unsafe events will hit other businesses, not theirs. Unfortunately, this tends to be an all too human thought process for all kinds of similar events which seems to have served to inhibit capital spending on safety and operational integrity improvement initiatives.

The primary aspect of the business that all executives have a keen interest in is profitability. Executives are willing to invest in approaches that measurably improve profitability. What may not be totally clear is the impact operational and functional safety control can have on profitability even in the absence of costly unsafe events. It has often been difficult for Environmental, Health & Safety (EH&S) leaders to get funding for the capital projects they propose because the "payback" is not obvious. But the payback for a systematic approach to operational integrity and safety management and control is huge. Industry needs a new way of thinking about, measuring and improving safety and operational integrity.

One of the inherent characteristics of many manufacturing operations and processes is that there is a chance that unsafe events could take place leading to undesirable consequences. The potential undesirable consequences include damage to plant equipment, injury to personnel and sometimes even loss of life, environmental damage, facility damage and resulting higher insurance costs. Therefore, controlling the safety of these operations is one of the key concerns and a high priority for most manufacturing companies.

Over the years a number of safety improvement approaches have been employed in industrial plants, such as safety audits, environmental audits, process alarming, constraining operator actions, fail safe instrumentation and the use of automatic safety shutdown systems. These have all been progressive steps forward in safety improvement, but a more systematic approach could realize much better results.

Without a systematic approach to safety management many plants have tended to err on the conservative side when approaching safety and operational integrity. For example, engineers have a tendency to set value limits and process alarms in zones they know to be safe in all circumstances, thus constrain at all times the process for the worst case situation. Operators tend to operate in a manner so as to avoid alarms which drives the plant to an even more conservative position from a safety perspective. The result of this has been reasonably fairly safe operating environments that are typically underperforming from an efficiency and profitability perspective. Controlling safety is very important, but so is profitability and efficiency. Any effective and systematic approach to safety must also be directly tied to efficiency and profitability.

BRIEF DESCRIPTION OF THE DRAWINGS

FIG. 12 is an exemplary corporate dashboard of one embodiment of the invention.

SUMMARY

Figure 1:
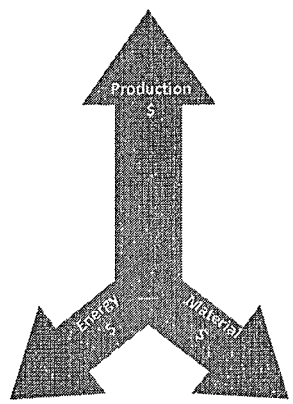
FIG. 1 is a vector illustration of three variables comprising the real time components of profitability.

In one exemplary form, the invention comprises a system for assessing risk of an operation of a user including a storage device, an operational safety risk input interface, a conditional safety risk input interface, a rules engine, a processor, and a safety risk analysis measurement output interface. The operational safety risk input interface receives operational safety risk information from the user or from other systems of the operation. The operational safety risk information is stored in the storage device and is indicative of an operational safety risk measurement of the operation. The conditional safety risk input interface receives conditional safety risk information from the user or from other systems of the operation. The conditional safety risk information is stored in the storage device and is indicative of a conditional safety risk measurement of the operation. A rules engine of computer executable instructions is stored in the storage device for determining at least one of (1) an operational safety risk measurement for the operation as a function of the operational safety risk measurement information stored in the storage device and (2) a conditional safety risk measurement for the operation as a function of the conditional safety risk measurement information stored in the storage device. The processor is connected to the storage device and executes the rules engine instructions for determining a safety risk analysis measurement based on the determined operational safety risk measurement for the operation and/or based on the determined conditional safety risk measurement for the operation. The safety risk analysis measurement output interface is connected to the processor and indicates the determined safety risk analysis measurement for the operation.

In another exemplary form, the invention comprises a computerized method for assessing risk of an operation of a user. The method comprises executing computer executable instructions stored in a memory. The instructions include:

receiving operational safety risk information from the user or from other systems of the operation, said operational safety risk information stored in the storage device and indicative of an operational safety risk measurement of the operation;

receiving conditional safety risk information from the user or from other systems of the operation, said conditional safety risk information stored in the storage device and indicative of a conditional safety risk measurement of the operation;

determining at least one of an operational safety risk measurement for the operation as a function of the operational safety risk measurement information stored in the storage device and a conditional safety risk measurement for the operation as a function of the conditional safety risk measurement information stored in the storage device;

determining a safety risk analysis measurement based on the determined operational safety risk measurement for the operation and based on the determined conditional safety risk measurement for the operation; and indicating the determined safety risk analysis measurement for the operation.

In another exemplary form, the invention comprises a system for assessing risk of an operation including a storage device, a rules engine, and a processor. The rules engine of computer executable instructions is stored in the storage device and determines a safety risk measurement. The processor is connected to the storage device and executes the rules engine instructions for determining a safety risk measurement. The rules engine instructions comprise instructions for:

Establishing the organizational arrangements of the operation to implement indicators;
Specifying a scope of the indicators;
Identifying a risk control system corresponding to the indicators and its outcomes;
Identifying critical elements of the risk control system;
Establishing a data collection and reporting system of the critical elements;
Reviewing the critical elements compared to a benchmark; and
Determining a key performance indicator (KPI) model and a safety performance; and
Determining a safety performance indicator (SPI) based on the determined KPI model.

In another exemplary form, the invention comprises a system for assessing risk of an operation of a user comprising a storage device, an input interface for defining key performance indicators (KPIs) from the user, an interface for monitoring the defined KPIs and for receiving KPI information corresponding to the monitored KPIs and indicative of risk, a rules engine of computer executable instructions stored in the storage device, said rules engine for defining a safety performance indicator (SPI) based on the received KPI information, a processor connected to the storage device and executing the rules engine instructions for determining the SPI, and an SPI output interface connected to the processor and indicating the determined SPI for the operation. an input interface for defining key performance indicators (KPIs) from the user, said KPIs stored in the storage device and indicative of a risk measurement of the operation.

The embodiments provide dynamic strategies for controlling the safety of industrial operations while also driving the operations as profitably as possible. In order to realize these new strategies, a real time view of the safety risk for the operation or any component of the operation is made available through systems and methods of the embodiments of the invention. Developing real time Safety Risk factors for these operations provides a more rigorous and systematic approach to process safety. Thus, users are enabled to make the best decisions to maximize profitability by identifying and minimizing operating risk exposure.

Outcomes for the user include but are not limited to at least one of increased profitability, increased production value, better asset utilization, greater asset useful lifetime, more knowledge retention, increased ability to attract top talent, better understanding of risk, better understanding of financial impact of risk, and/or improved employee morale. As a result, unplanned downtime, energy costs, raw material costs, staff turnover, and/or environmental impact (EI) are minimized.

DETAILED DESCRIPTION

Real Time Variability and Profitability

In order to fully understand the impact of safety on profitability it is important to first recognize a key business driving force that is currently impacting industrial operations. The driving force is the transition from the highly stable business variables over long time periods to the frequently fluctuating business variables of today. This transition is having a huge impact on the profitability of even well run operations as the business of industry has started to experience dynamic fluctuations that are almost as "real time" as those of production processes. For example, with the opening of competition on the power grids, electricity prices, which had been constant for months on end just a few years ago, have started to change every 15 minutes in the U.S. and even more frequently in some other geographies. This has had a knock on (e.g., secondary) effect on other business variables such as other energy prices, feedstock prices and even the production value of the products being produced. Industrial companies have become used to measuring and reporting their key business variables on a monthly basis, which appeared to be reasonable when those variables did not change within monthly boundaries. Today, companies that measure these variables monthly, weekly, daily or even hourly will find themselves in a situation in which the profitability of their business is out of control even when their plant operations are in control.

Not all components of profitability are experiencing real time fluctuation. For example, labor cost still tends to be fairly stable over a monthly time period. But a number of key components of the profitability of an operation, such as production value 102, energy cost 104 and material cost 106 are fluctuating more and more frequently with time. These three variables are considered the real time components of profitability, as illustrated in FIG. 1. The primary object would be to maximize the production value of the operations while simultaneously reducing the energy and material costs by as much as possible. As FIG. 1 illustrates production value 102 increases profitability while energy costs 104 and material costs 106 decrease profitability.

Figure 2:
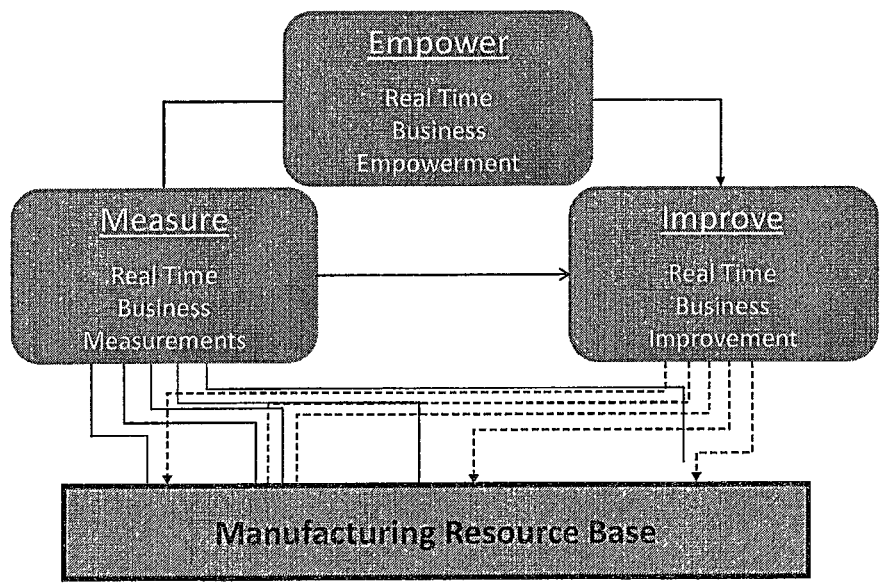
FIG. 2 is a block diagram of a feedback control loop of a system for balancing in real time the profitability components of FIG. 1

Balancing these three variables to continually maximize the profitability of the operation is a fairly classic control problem, which is why it is referred to as real time profit control. To solve such a control problem requires a control approach. As illustrated in FIG. 2, the application of a simple feedback control loop to the real time profitability variables is an effective starting point. The first component of the loop is a measure 202 of the business variables in real time. Invensys has developed an approach called Dynamic Performance Measures (DPM) to model the measures of these variables from process sensor data in real time (e.g., see U.S. Published Patent Application No. 20030060993). After the variables are measured in the necessary time frame, the resulting information is provided to the operator who impacts the business variable through a scorecard or dashboard. This is the second empowerment component 204 of the loop. Empowering profit impacting operational personnel in this manner enables them to make better decisions that drive profitability. This essentially provides a manual control strategy for profitability. Experience has shown that over time even frontline operators with moderate education levels learn to drive significant profitability improvement. The third component of the loop is the ongoing improvements 206 that are implemented to incrementally improve the profitability of the operation, such as changing fuels or optimizing set points. Using this approach on each of the real time business variables can start to bring those variables under control and help drive profitability improvements of a manufacturing resource base 208.

The Impact of Safety on Real Time Profitability

Figure 3:
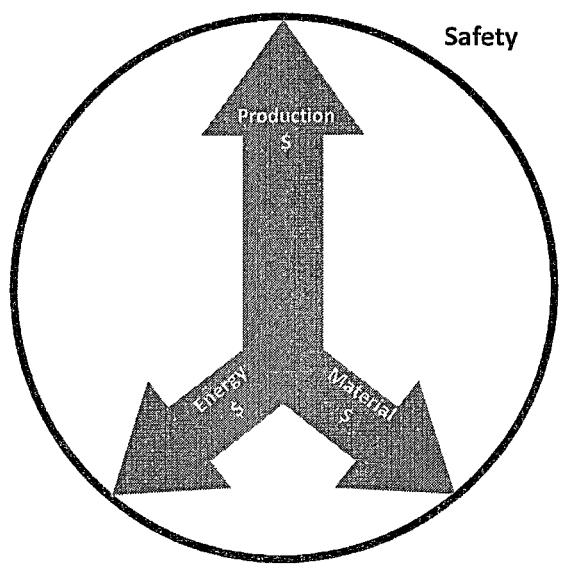
FIG. 3 is a vector illustration of three variables comprising the real time components of profitability as shown in FIG. 1 including a safety constraint.

The vector diagram of FIG. 1 representing real time profitability is incomplete. There are constraints on the profitability that limit the length of the vectors and the overall profitability of the process. For example, the installed manufacturing equipment itself will provide some limits, such as the capacity of a pump, the size of a vessel or pipe, and the efficiency of a unit. Most of those constraints are fairly easy to identify and are fixed. But there is one constraint, made up of multiple constraint functions, that tends to fluctuate in real time in a similar manner as real time profitability. That constraint is safety which may impact people, process, and environmental. The actual real time profitability model should include the safety constraint. As illustrated in FIG. 3, the safety constraint is a circle 300 but it may be any shape. This model as illustrated in FIG. 3 shows the tight relationship between operational safety and real time profitability.

Figure 4:
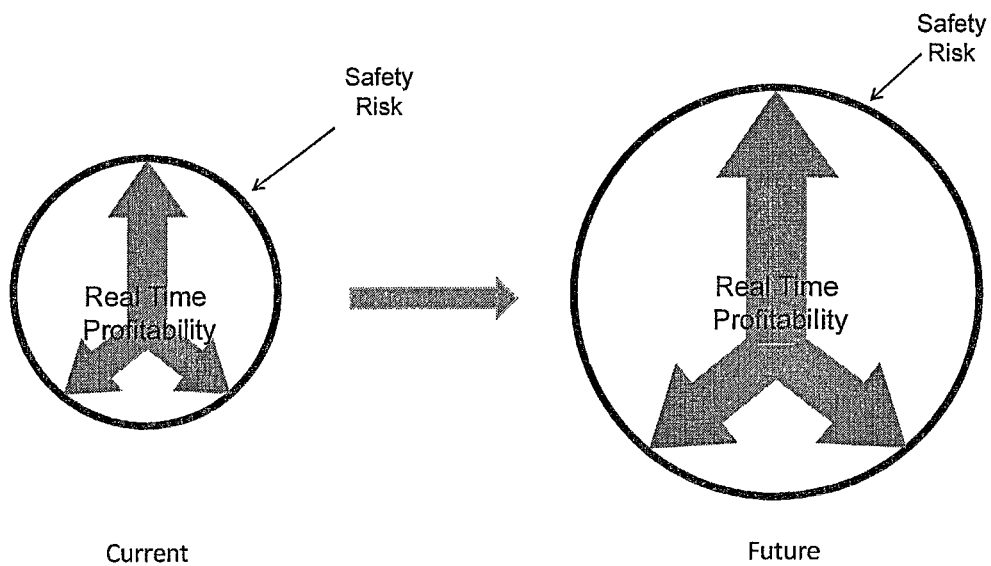
FIG. 4 is a diagram demonstrating the relationship between the safety constraint and the real time profitability of an industrial operation over time.

FIG. 4 illustrates the relationship between the safety constraint and the real time profitability of an industrial operation. The left side real time profitability model 402 represents the current operation of the plant wherein the current profitability is constrained by the current safety risk. In other words, for the plant operations staff to improve the profitability they would significantly increase the safety risk to unacceptable levels. On the other hand, if the safety risk constraint could be "expanded" as illustrated in the right side profitability model 404 representing the future operation of the plant, then the profitability could be improved within acceptable safety limits. This, of course is assuming that other fixed constraints, such as equipment constrains are not more constraining than safety. The key to being able to improve the profitability of the operations, therefore, is the opening of the safety constraint on the profitability. In this illustration, the safety constraint is a circle and expanding the risk constraint increases the radius of the circle (e.g., symmetrically). In general, the safety constraint may be any shape and its expansion may be asymmetrical.

Since some of the critical components of safety fluctuate in real time, they present a similar control problem to that of profitability. Once these components are effectively measured in an ongoing real time manner, the appropriate automatic or manual control approach is implemented. The challenge is measuring safety risk in a manner that will enable the control system to be developed. Before addressing an effective way to measure safety risk, it is important to understand that the constrained vector model demonstrates the relationship between real time safety and real time profitability.

Opening the Safety Constraint

One key to determining the scope (e.g., shape and size) of the safety constraint is and how to expand it is accurately measuring the safety risk of a piece of equipment, process unit, plant area or plant in a real time, continuous manner. With ongoing real time measures of safety risk, plant operations can determine how hard they can safely drive the plant. Today, without an accurate measure of real time safety risk, it is typically assumed to be at some level that has been established through engineering analysis, often done years ago and is typically based on a worst case scenario. This means that the risk is assumed to be worse than it may be and that the assumed risk may impose tighter constraints on the process and profitability than actually exists at that time. This assumed risk tends to reduce profitability well below the actual safe potential. Even worse, without the real time safety risk measures, when circumstances around the operation combine to increase the safety risk, that increased risk often goes unnoticed. This results in not only a less profitable operation, but also a less safe operation.

Thus, there is a need to develop continuous, real time safety risk measures. This is accomplished by developing a dual view system and method of safety risk and combining this dual view into composite safety risk measures. The first view of safety risk is the operational safety risk, which includes safety compliance and involves following the processes and procedures with respect to inspections, audits, and reviews determined during the design of the plant. These audits should be accomplished on a defined schedule to ensure that the operational safety risk is as low as possible. History has demonstrated that operations that follow the compliance audits and take action based on the findings of the audits judiciously tend to have much lower safety risk.

Unfortunately, following the operational and compliance procedures with great rigor does not eliminate the safety risk. Unexpected events and conditions that cannot be discerned during an inspection can develop that drive up safety risk. Therefore, the second view of safety risk involves online condition monitoring and measuring. This is referred to as the conditional safety risk. The information necessary to discern increases in the probability of an unexpected, unsafe event should be readily available for any plant with an operational history. A prognostic evaluation of the data in the historical database for the process combined with understanding of the process flow and knowledge of the time of previous unsafe events enables identification of critical lead indicators for potential future unsafe events. These leading indicators serve to identify aspects of the conditions that have preceded unsafe events in the past and would be likely to precede future similar unsafe events. As such, monitoring these leading indicators to discern emerging patterns that predict unsafe events would provide information on the conditional safety risk of the operation. The aspects of the conditions that might lead to an event are monitored to detect any suspicious changes. Automatic workflows are triggered that further assess the situation, and increase the conditional safety risk measure according to the probability, potential timing, severity of a potential event, and advice the operating personnel.

Figure 5:
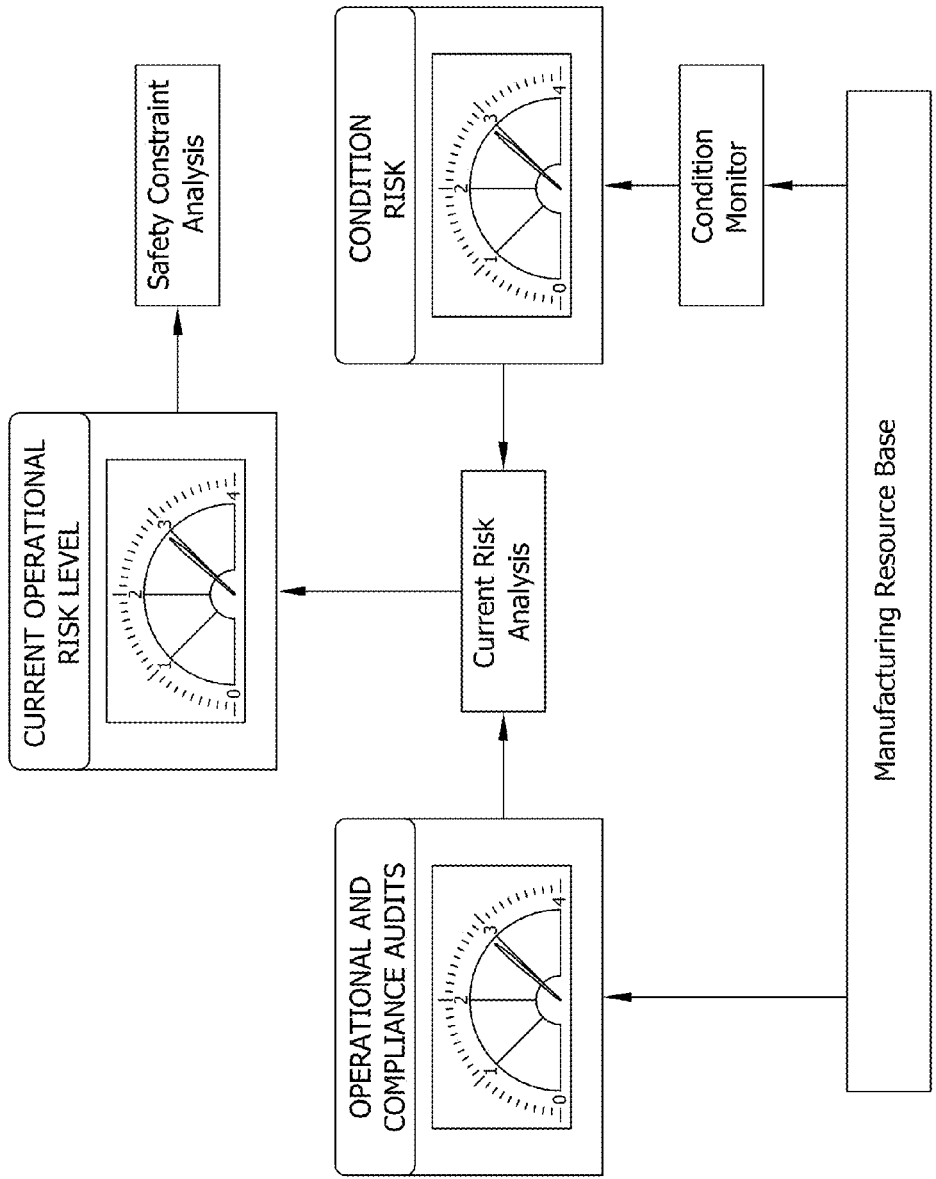
FIG. 5 is a block diagram of one embodiment of the invention of a real time safety risk measurement system.

Since having two separate safety risk views and corresponding measures increase the operational difficulty of assessing the actual safety risk and could lead to confusion, systems and methods of embodiments of the invention indicate a composite safety risk measure for the operation. This composite measure should take the operational safety risk measure (including compliance measures) and conditional safety risk measure as inputs, as illustrated in FIG. 5, and perform appropriate analytics on the two measures to establish the composite safety risk measure which is representative of the actual current safety risk. In one embodiment, the composite measure is heavily weighted to the higher of the two input safety risk components. Another embodiment can merely take the higher of the two component risk factors, but this approach may be too simplistic for certain complex production operations. Some embodiments may employ analysis rules which analyze and compare both component measures against each other to develop the composite safety risk measure of the operation. Other embodiments are also contemplated. With this real time safety risk factor for every operation in the plant and for the plant as a whole, the operating personnel can make decisions that improve plant profitability while understanding the impact of their decisions on the safety risk in the plant.

Determining the current operational risk level for a unit, process or plant is based on combining the operational & compliance risk measures and conditional risk measures in an appropriately conservative manner. A conservative approach is preferred due to the potential cost of an unsafe event in terms of financial, injury and loss of life. The operational & compliance risk and the conditional risk are measured separately as in FIG. 5 and the best conservative composite measure of operational risk is simply the highest risk level of the two component risk measures. It is the composite operational risk that is to be used by the operators during normal plant operations to guide their actions and improve safety and profitability.

Figure 6:
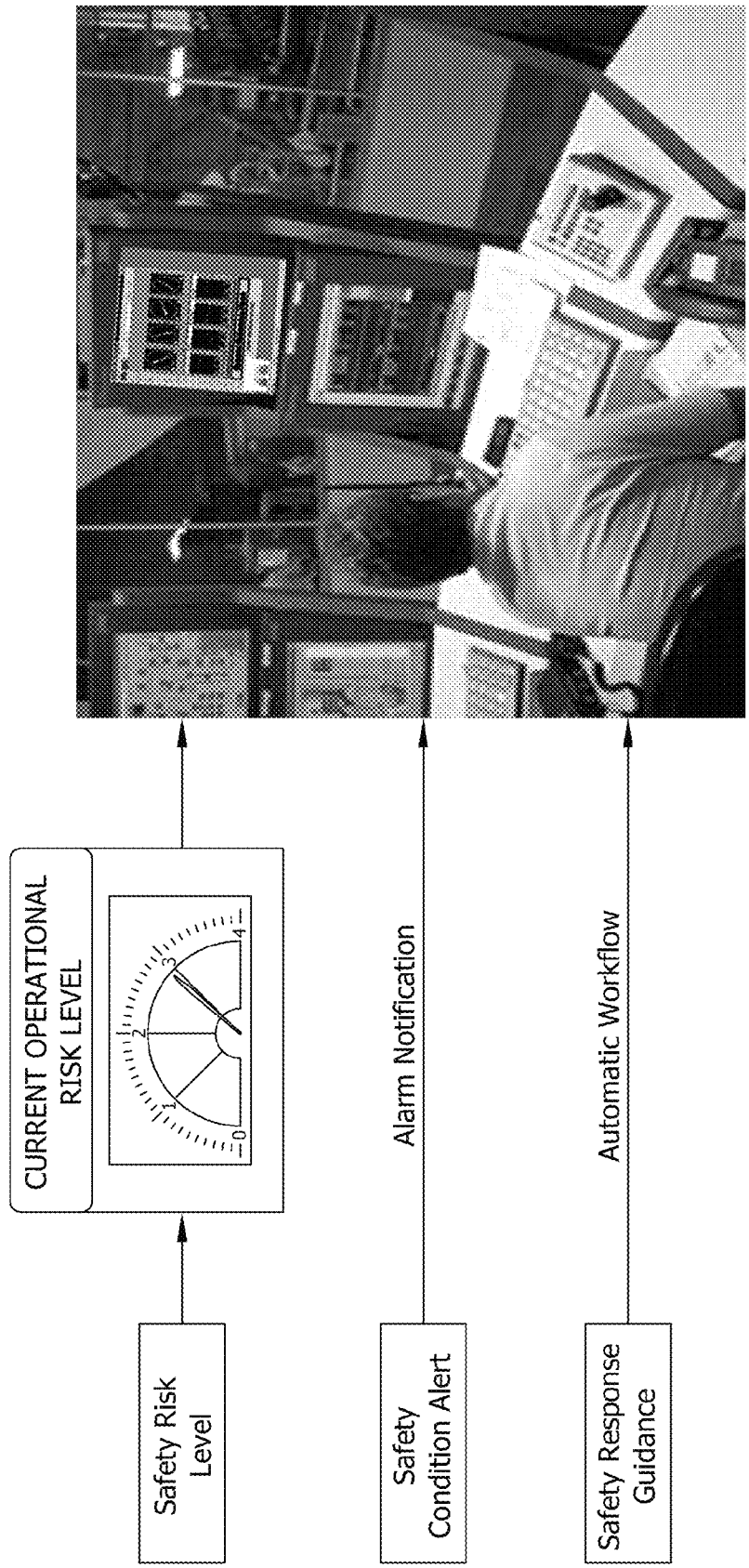
FIG. 6 is a diagram of one embodiment of the invention including an indicator for safety risk level, a safety condition alert alarm notification and a safety response guidance automatic workflow initiator.

FIG. 6 is a diagram of one embodiment of the invention including an indicator for safety risk level, a safety condition alert alarm notification and a safety response guidance automatic workflow initiator. During normal plant operations there are three mechanisms that combine to communicate the current operational risk level to operators and help guide their actions and responses as displayed in FIG. 6. A simple safety risk level indication is included as part of the operators' performance dashboard along with critical, prioritized dynamic performance measures tied to plant profitability. His combination provides the operators with the real time safety risk and real time performance information required to drive profitability in a safe manner. A safety condition alert signal can trigger an alarm condition at the operators console to inform the operators of a safety risk level change that may need to be addressed. Finally, the system can trigger a workflow on a change in safety risk level that can guide operator response or can directly and automatically respond to the safety risk issue.

Real Time Safety Risk Control

Applying feedback control to safety risk is accomplished by utilizing the control model of FIG. 3 for the composite safety risk measurement. For operational and compliance safety risk issues, the controls are applied by keeping the operational safety risk measurement visible to the leaders of the Environmental, Health & Safety (EH&S) team responsible for the safety compliance audits, and if significant violations of expected processes are encountered to automatically notify plant management of a violation, a situation, a condition or a safety risk analysis measurement for the operation. For example, a notification module may provide a text, an email or other electronic message (e.g., a phone call or beeper alert) to an operator as a notification. Automatically triggered workflows are developed in the system that trigger workflows to notify and guide the compliance processes and to keep management in the loop both when the processes are correctly followed and when there may be a safety issue. This level of feedback sets up an operational safety risk control system that reduces the safety risk of a plant. In one embodiment, a workflow is triggered when a safety risk analysis measurement is outside a preset range.

A similar approach is taken to the conditional safety risk of the operation, although conditional risk is typically less dependent on human processes than it is on unexpected failures and other unanticipated events. For the conditional safety risk a predictive conditional safety system uses automatic workflow to (1) monitor for a potential safety condition, (2) identify the condition and (3) initiate an appropriate corrective action, or initiate a notice to an operator of the situation or initiate an indication to an operator action to be taken. All three components of this conditional safety risk control system are set up for automatic operation. Setting up the correct safety conditions monitor involves a detailed understanding of the history of operation of the plant and of other similar plants. A team must analyze the historical data to identify the lead indicators of an unexpected event and must set up the safety condition monitor to trigger from these lead indicators. The safety condition identification function must be set up to monitor combinations of factors to try to focus in on the potential unsafe conditions or, perhaps the few potential conditions that trigger a lead indicator. The corrective action function must be set up to take various corrective actions based on the circumstances identified for the potential event. This is not unlike the approach to safety taken with traditional batch service logic for decades, but this perspective must be taken for the plant as a whole. One other consideration that is also similar to batch service logic is that the identified condition may need to be contextualized to the operating state of the plant in order to truly determine the potential situation's significance.

In one embodiment, a safety control system to effectively control the safety risks within the other process constraints is initially implemented. Then, a similar approach is employed to develop a profit control system for controlling the real time profitability of the operation. In this embodiment a process control system is installed on the process to control the efficiency of the operation. A number of highly critical unsafe events associated with the processing are identified and a safety instrumented system, such as systems from Triconex, is installed in the same process. The safety instrumented system is programmed to identify an impending highly critical unsafe event and respond immediately to drive the process to a safe condition. This is typically done independently from the process control system, but may at times be coordinated with the process control system. When it is coordinated with the process control system the safety instrumented system becomes the master and the process control system is subservient to ensure unsafe events take priority over normal processing. In these instances the safety risk indicator is still of value in terms of identifying other, less safety critical potential events and responding to them and in terms of identifying potential highly critical safety on a much earlier time frame than the safety instrumented systems and thereby taking action to avoid the event. In this way the safety risk measurement indicator can actually help to avoid unnecessary plant slowdowns and shutdowns. This can have a very significant positive impact on the profitability of the operation.

Real Time Profitability Control

Loosening the safety constraints on a production operation does not, by itself, lead to increased profitability. It merely means that there could be potential to increase profitability safely. Actually driving increased profitability requires the implementation of controls to the three vectors of the real time profitability model presented in FIG. 1. Again, this is accomplished through a feedback control system by applying the model presented in FIG. 3 to the production value, energy cost and material cost of the operation by providing a prioritized and contextualized scorecard or dashboard to the operator of the process showing the real time values of the business variables under consideration. As the operators perform the actions expected, such as changing set points, managing alarm conditions, and activating various control strategies, they can monitor the impact that the changes are having on the safety risk analysis measurement of the system and method, as well as other key business measures presented on a dashboard. Over time, the system and method teaches operators how their actions impact the real time profitability of the operation and can tune their actions to maximize the profitability. When this is accomplished, specific improvement actions may be considered for the operation, such as the implementation of advanced control strategies that further drive the profitability of the operation. Since the impact on the operation of these incremental improvement activities is visible to the operations staff, they will be less likely to turn them off if they are actually having the desired impact.

The issue of combining the safety risk measure and the profitability controls together includes, at least initially, providing a value for a real time safety risk visual indicator on an operation dashboard. This visual real time safety risk value will provide immediate feedback to the operators of the increased or reduced safety risk resulting from an action enabling the operators to take appropriate profitability improving actions while also mediating the safety risk to the operation. In a sense, the system and method simultaneously balance safety risk, production value, energy cost and material cost, which is tantamount to solving a multiple objective optimization problem. Mathematically solving this type of problem is very challenging and time consuming. According to the system and method, an operator with reasonable experience can learn to solve such a problem quite effectively over time.

Over time, with enough experience and historical information about the relationships between the safety risk and profitability of an operation, the relationships between the critical variables may be able to be quantified and modeled. Once this is possible, automatic control models and algorithms for the operation may be able to be developed for the automatic safe control of real time profitability. The control and optimization systems prescribed herein should be able to help production companies realize a considerable portion of the potential profitability improvements than is realized in their operations while also creating a safer operational condition for the plant and the environment.

Measuring Safety Risk

Traditionally, safety and profitability have appeared to be diametrically opposed concepts for manufacturing and production operations. Since the primary objective for any manufacturing or production business is to make profits, safety of people, plant and environment have often been viewed as a necessary evil. As such, Environment, Health & Safety (EH&S) teams in industrial companies have typically been viewed as adjunct organizations that are not part of the main stream business. Such positioning has made the job of the EH&S teams more challenging to effectively execute. Fortunately, implementing control theory according to embodiments of the system and method lead industrial companies in a different direction with respect to safety. The safe operations of industrial plants are now understood to be a direct factor in the profitability of those plants. As such, ES&H is turned into a mainstream business process of industrial companies and new levels of both safety and profitability results. Real time safe profitability is no longer a dream—it is a reality!

Part of the problem is that safety risk has primarily been perceived as a fairly static variable in industrial operations. The safety risk analysis is often undertaken at the design stage of an operation and the results of that analysis is used throughout the assets life. Common sense dictates that safety risk variables such as life of equipment, maintenance level of equipment and inspection rigor will vary with operational stages of a process. For example, it is not unusual for the safety risk of a chemical plant to be higher during plant startup and shutdown than during normal operations. This leads to the conclusion that safety risk is dynamic and the best way to measure the risk is dynamically. Since many manufacturing processes experience change in real time, it is fair to conclude that safety risk for most industrial operations fluctuates in real time.

The key contributing factors that directly affect safety risk are strict compliance to operational safety—referred to as operational risk—and unexpected events or conditions that arise during operation—referred to as conditional risk. Thus, in general, composite safety risk factor (SR) is defined as a weighted sum of the operational safety risk (OSR) and the conditional safety risk (CSR) or:

$$SR=w_1*OSR+w_2*CSR \quad (1)$$

wherein $w_1$ and $w_2$ are weighting factors.

Preferably, an effective risk factor should consider both of these basic components of safety risk although considering only one component may be effective in certain environments. The problem is that safety risk is not a directly measurable factor at this point in time. Therefore, establishing a real time modeled safety risk factor for industrial assets, asset sets and entire plants is a critical first step in the development of a more systematic safety control approach.

A safety risk factor (SR) is defined as the probability (P(e)) that an unsafe event will occur times the severity potential (S(e)) for that event or:

$$SR=P(e)*S(e) \quad (2).$$

Since probabilities range from 0.0 to 1.0, it is preferable but not necessary to scale the severity factor from 0.0 to 1.0 as well which will result in a range for SR or 0.0 to 1.0. The most important aspect of SR is that it provides an indication of the current safety risk as an indication of whether the process is being operated in a safe manner. A scale normalized from 0.0 to 1.0 meets this requirement.

Developing a quantitative measure of the severity potential P(e) is accomplished in a number of ways since probabilities are inherently quantitative. Without the system or method of the invention, developing the scale for the severity potential S(e) is a challenge because putting potential severity on a normalized scale (or weighting) requires that the business define what an unacceptable level of severity is for their organization and set that level and any higher severity level to 1.0. There may also be a need to evaluate the low severity end of the scale based on a consequence level that is actually below what might be considered a safety issue. For example, an unexpected part failure in a pump may cause the pump to become unavailable and may require some cost to repair, but the severity is lower than what might be considered a safety issue. It is interesting to note that from this perspective a traditional maintenance perspective may actually scale right into a safety perspective. In any case, considerable consideration must go into setting the high and low severity limits for the severity potential S(e) and then evaluating potential event consequences within this scale to determine the S(e) for any given event. Consideration for the S(e) value should be given to the total consequence of an event in terms of injury, loss of life, equipment damage, business interruption, repair costs and insurance costs.

As previously stated, there are two basic contributing aspects to the overall safety risk from the use of an asset or asset set: operational safety risk and conditional safety risk. Each of these base safety risk factors has the same basic characteristic as the overall safety risk factor as described above. Therefore, the equation for operational safety risk factor (OSR) indicated by equation (2) is:

$$OSR = P_o(e) * S_o(e) \quad (3).$$

The $P_o(e)$ for any potential event that might happen is established by evaluating the current state of the process safety hazard analyses and risk assessments for the asset or asset set. If a company is rigorously following the prescribed processes the probability will be at some base level for the operation and the further the organization varies from the prescribed plan to higher the probability of an event should rise. This is determined by evaluation of plant, company or industry history. The $S_o(e)$ value should reflect the most severe potential damage that could be generated from a failure in the plant section under consideration. This is due to the criticality of safety to most industrial operations. By setting the $S_o(e)$ to reflect worst case severity there will be a natural conservative bias in the system.

If there are multiple events that could possible happen in an asset set, then the maximum OSR of all the events should be the OSR for the asset set.

The equation for the conditional safety risk factor (CSR) indicated by equation (2) is:

$$CSR = P_c(e) * S_c(e) \quad (4).$$

The $P_c(e)$ for any potential event that might happen in the asset set is determined from plant history, industry history or engineering analysis based on an analysis of process measures that provide lead indication that the probability of the event is increasing. For example, if history shows that prior to the occurrence of the event in the past two process temperatures started increasing and a vessel pressure started to drop, analysis of process history will help determine that if all three indicators happen what percentage of time has that led to the occurrence of the event. With a large enough experience base, this percentage divided by 100 becomes the probability. With a smaller experience base some assumptions will need to be made to establish this value. Initially those assumptions should be fairly conservative.

The $S_c(e)$ is established by determining the maximum damage that can reasonably be expected if event e were to happen. It is important to consider all damage and not just the damage to the assets for which the factor is being developed. In other words, this should reflect the damage to the plant equipment, damage to personnel and damage to the environment from a cost perspective, not just the damage to the assets alone.

Once again, if multiple potential events may happen due to the condition identified, the largest CSR factor of all of the potential events should be used for the CSR of the entire asset set under consideration since this will show the most severe safety risk.

Establishing the composite safety risk (SR) for an asset or asset set is accomplished in various ways according to various embodiments. In one embodiment in which no weighting is used (i.e., w1=w2=1), the composite safety risk (SR) for an asset or asset set is the sum of the operational safety risk (OSR) and the conditional safety risk (CSR) or:

$$SR = OSR + CSR \quad (5).$$

In another embodiment in which weighting is used, the composite safety risk (SR) for an asset or asset set is the weighted sum of the operational safety risk (OSR) and the conditional safety risk (CSR) as noted in equation (1):

$$SR = w_1 * OSR + w_2 * CSR \quad (1).$$

In another embodiment in which no weighting is used (i.e., w1=w2=1), the composite safety risk (SR) for an asset or asset set is indicated by the maximum of the operational safety risk (OSR) and the conditional safety risk (CSR) or:

$$SR = MAX\{OSR, CSR\} \quad (6),$$

I.e., by selecting the maximum of the OSR and CSR for the asset or asset set (see FIG. 5).

In another embodiment in which weighting is used, the composite safety risk (SR) for an asset or asset set is indicated by the maximum of the weighted value of the operational safety risk (OSR) and weighted value of the conditional safety risk (CSR) or:

$$SR = MAX\{w_1 * OSR, w_2 * CSR\} \quad (7).$$

If the asset set under consideration is comprised of multiple assets each with a calculated SR, then in one embodiment the SR for the asset set is set to the weighted or unweighted maximum SR for all of the individual assets and asset groupings within the asset set.

The net result for each embodiment is a single SR for each asset and asset set in an industrial operation that has safety implications for the plant as a whole.

System

Figure 7:
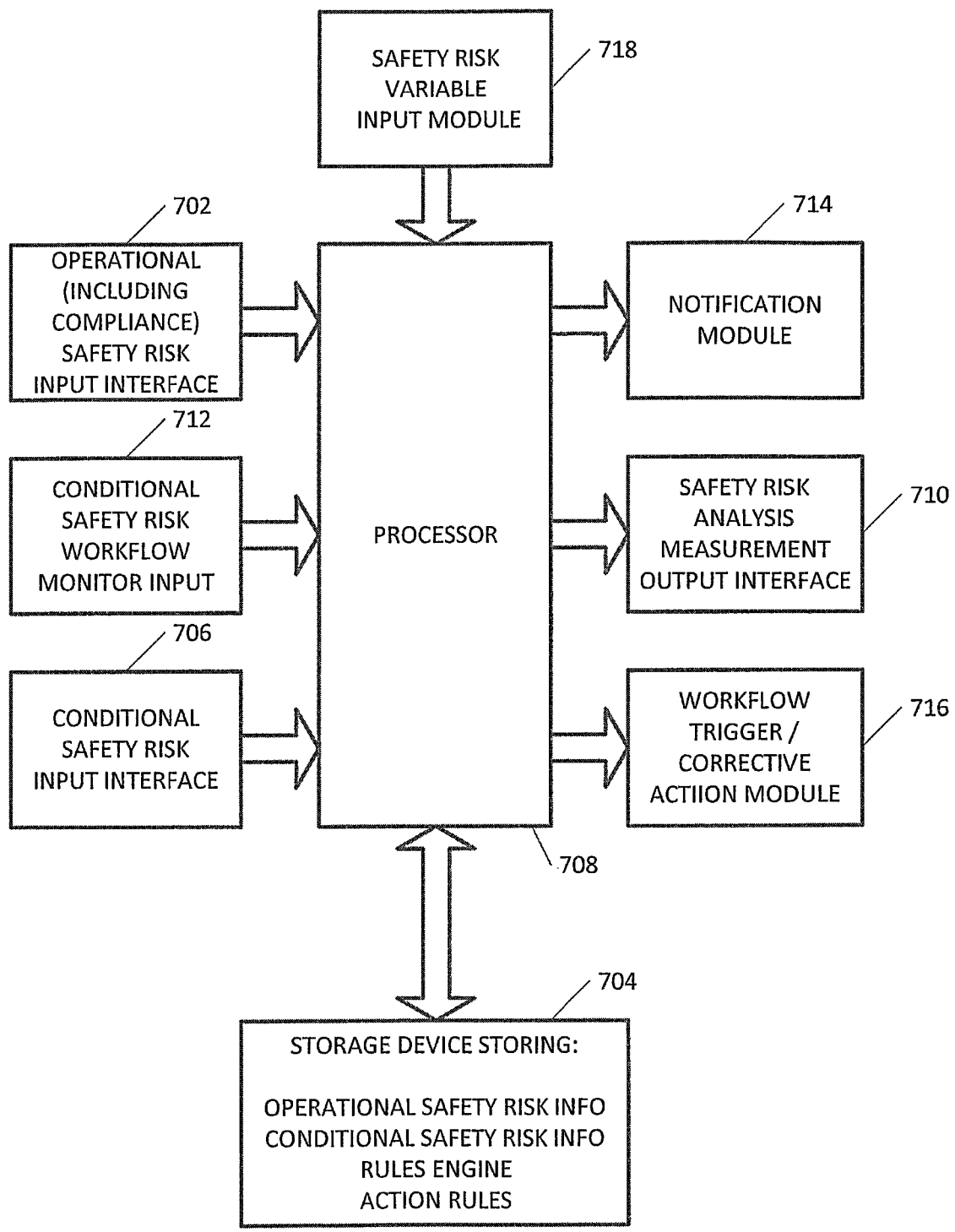
FIG. 7 is a block diagram of one embodiment of a computer implemented system of the invention.

Referring to FIG. 7, one embodiment of a system for assessing risk of an operation of a user according to aspects of the invention is illustrated. An operational (including compliance) safety risk input interface 702 receives operational safety risk information from the user or from other systems of the operation. For example, the interface 702 may be a screen shot on a touch screen allowing the operator to provide operational safety risk information. The operational safety risk information is stored in a 704 storage device 704 and is indicative of an operational safety risk measurement of the operation. A conditional safety risk input interface 706 receives process data to provide conditional safety risk information. A critical system safety risk analyzer which monitors process data provides an unsafe event load indicator. The conditional safety risk information is stored in the storage device 704 and is indicative of a conditional safety risk measurement of the operation.

A rules engine of computer executable instructions is also stored in the storage device 704. The rules engine comprises computer executable instructions for determining at least one of an operational safety risk measurement for the operation as a function of the operational safety risk measurement information stored in the storage device 704 and for determining a conditional safety risk measurement for the operation as a function of the conditional safety risk measurement information stored in the storage device 704. A processor 708 connected to the storage device 704 executes the rules engine instructions for determining a safety risk analysis measurement based on the determined operational safety risk measurement for the operation and based on the determined conditional safety risk measurement for the operation. A safety risk analysis measurement output interface 710 connected to the processor 708 indicates the determined safety risk analysis measurement for the operation. For example, the interface 710 may be a screen shot on a touch screen allowing the operator to view the determined safety risk analysis measurement for the operation.

A conditional safety risk work flow monitor input 712 monitors a potential safety condition, identifies when the monitored condition is outside a given range which may be problematic and initiates at least one of a corrective action, a notice to an operator of the situation and an indication to an operator action to be taken. Optionally, a notification module 714 of computer executable instructions executed by the processor 708 is responsive to the input 712 to notify an operator of a situation, a condition or safety risk analysis measurement for the operation. An action rules engine of computer executable instructions stored in the storage device 704 selectively activates the notification module in response to the determined safety risk analysis measurement for the operation. In one embodiment, the notification module 714 provides at least one of a text, an email or other electronic message to an operator as a notification.

Optionally, the system may include a workflow trigger/corrective action module 716 of computer executable instructions executed by the processor 708 for triggering workflows in response to the safety risk analysis measurement to notify and guide a compliance process or to keep an operator informed via the safety risk analysis measurement output interface. As a result, the operator is aware when processes are correctly followed or when there may be a safety issue. An action rules engine of computer executable instructions stored in the storage device 704 selectively activates the action module 716 in response to the determined safety risk analysis measurement for the operation. For example, a workflow may be triggered when a safety risk analysis measurement is outside a preset range.

Optionally, a safety risk variables input module 718 indicates a status of variables that impact safety risk, wherein the variables include at least one of life of equipment, maintenance level of equipment and inspection rigor.

In one embodiment, the safety risk analysis measurement is a weighted composite which is a function of the operational safety risk measurement information stored in the storage device 704 or as a function of the conditional safety risk measurement information stored in the storage device 704. As noted above, the processor 708 determines the safety risk analysis measurement for the operation according to the following:

$$SR = w_1 * OSR + w_2 * CSR \quad (1),$$

wherein SR is the safety risk analysis measurement, $w_1$ and $w_2$ are weighting factors, OSR is an operational safety risk determined by the processor 708 based on the received operational safety risk information and CSR is a conditional safety risk determined by the processor 708 based on the received conditional safety risk information.

In one embodiment, the processor 708 determines the safety risk analysis measurement for the operation according to the following:

$$SR = OSR + CSR \quad (2),$$

wherein SR is the safety risk analysis measurement, OSR is an operational safety risk determined by the processor 708 based on the received operational safety risk information and CSR is a conditional safety risk determined by the processor 708 based on the received conditional safety risk information.

In one embodiment, the processor 708 determines the safety risk analysis measurement for the operation according to the following:

$$SR = MAX\{OSR, CSR\} \quad (6),$$

wherein SR is the safety risk analysis measurement, OSR is an operational safety risk determined by the processor 708 based on the received operational safety risk information, and CSR is a conditional safety risk determined by the processor 708 based on the received conditional safety risk information whereby the SR is the maximum of the OSR or the CSR.

In one embodiment, the processor 708 determines the safety risk analysis measurement for the operation according to the following:

$$SR = MAX\{w_1 * OSR, w_2 * CSR\} \quad (7),$$

wherein SR is the safety risk analysis measurement, $w_1$ and $w_2$ are weighting factors, OSR is an operational safety risk determined by the processor 708 based on the received operational safety risk information and CSR is a conditional safety risk determined by the processor 708 based on the received conditional safety risk information whereby the SR is the maximum of the $w_1 * OSR$ or the $w_2 * CSR$.

Method

Figure 8:
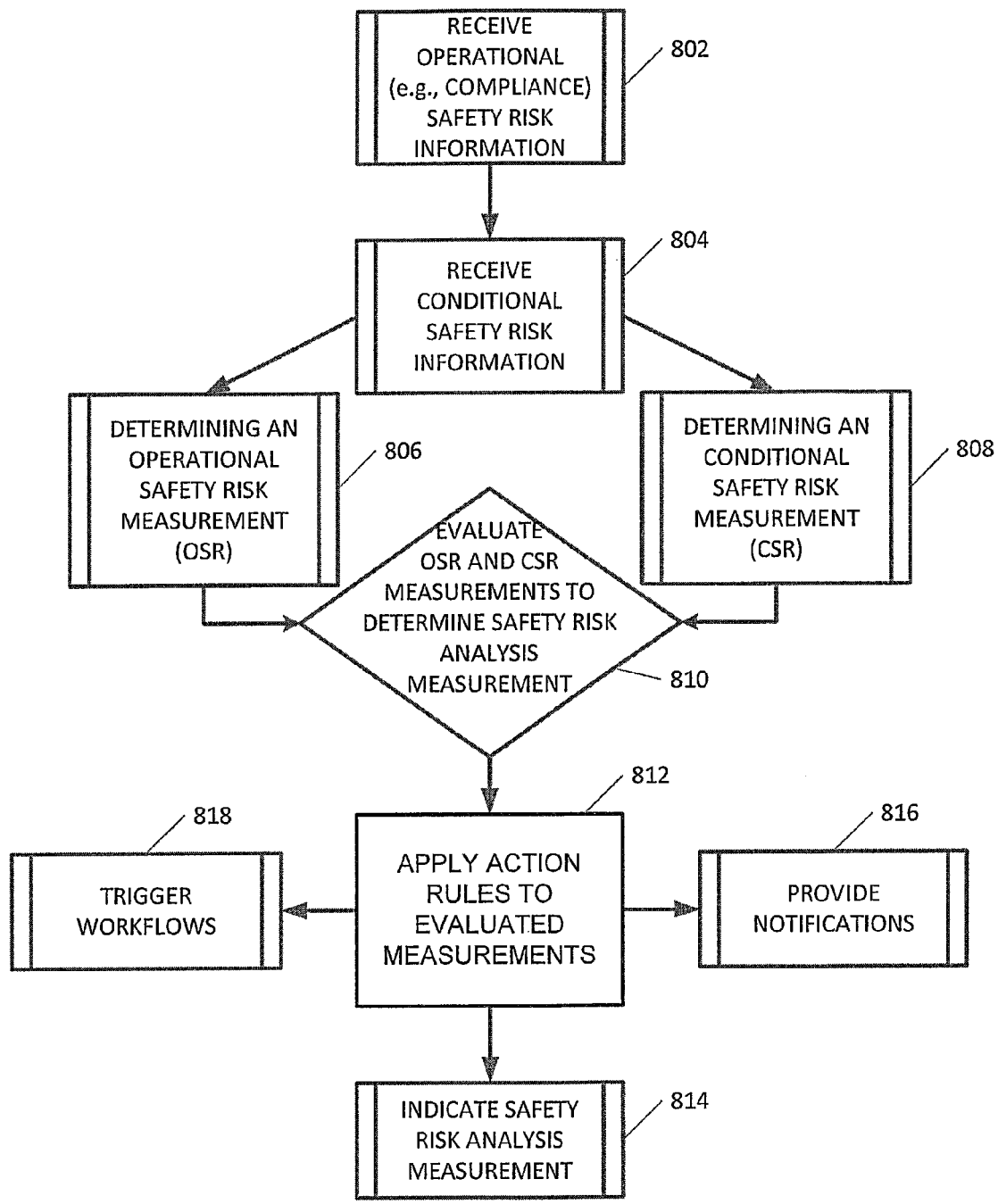
FIG. 8 is a flow diagram of one embodiment of a computer implemented method of the invention.

Referring to FIG. 8, a computerized method for assessing risk of an operation of a user comprising the steps of:

receiving at 802 operational safety risk information from the user or from other systems of the operation, said operational safety risk information stored in the storage device 704 and indicative of an operational safety risk measurement of the operation;

receiving at 804 conditional safety risk information from the user or from other systems of the operation, said conditional safety risk information stored in the storage device 704 and indicative of a conditional safety risk measurement of the operation;

determining at 806 an operational safety risk measurement for the operation as a function of the operational safety risk measurement information stored in the storage device 704 and/or determining at 808 a conditional safety risk measurement for the operation as a function of the conditional safety risk measurement information stored in the storage device 704; and determining at 810 a safety risk analysis measurement based on the determined operational safety risk measurement for the operation and based on the determined conditional safety risk measurement for the operation.

In addition, action rules 812 may optionally execute instructions for indicating at 814 the determined safety risk analysis measurement for the operation.

In addition, the method may include notifying at 816 an operator of a situation, a condition or safety risk analysis measurement for the operation, and selectively executing the notification module 714 in response to the determined safety risk analysis measurement for the operation.

In addition, the method may include triggering at 818 workflows in response to the safety risk analysis measurement to notify and guide a compliance process or to keep an operator informed via the safety risk analysis measurement output interface so that the operator is aware when processes are correctly followed or when there may be a safety issue. The triggering is selectively activated in response to the determined safety risk analysis measurement for the operation.

In addition, the method may include that the safety risk analysis measurement is a weighted composite which is a function of the operational safety risk measurement information stored in the storage device 704 or as a function of the conditional safety risk measurement information stored in the storage device 704.

The Relevance of a Real Time Safety Risk Factor

The safety risk factor (SR) is a variable that changes with operational conditions and risk assessment and audit rigor that indicates the current safety risk level for the asset or asset set under consideration. As the plant operates, audits are performed, or maintenance is performed on the assets, the SR of those assets will likely change indicating either that there is danger of an unsafe event or that there is safety risk room to drive the plant a little harder to realize more profitability from the operation. This will enable the plant personnel to respond more quickly and efficiently to elevated potential for the occurrence of unsafe events, but it will also indicate when the operators are keeping the profitability of the plant lower due to safety concerns that should not be concerns. The net result is the potential for a more systematic and intelligence based safety approach for the plant.

As a result, the systems and methods of the invention provide dynamic strategies for controlling the safety of industrial operations while also driving the operations as profitably as possible. In order to realize these new strategies, a real time view of the safety risk for the operation or any component of the operation is made available. Developing real time safety risk factors for these operations provides a more rigorous and systematic approach to process safety. The embodiments of the systems and methods work with teams to identify, model and implement the real time safety risk factors for each plant area in operation and help teach operating personnel how to use this new real time business intelligence to perform their jobs more efficiently and more profitably.

Increasing Process Safety Performance

Aspects of the invention provide a framework for process safety management and introduce a safety performance indicator and an incremental value-at-risk to summarize the quality of management for process safety. During the plant engineering phase, the asset owner should design the process plant with safety in mind—for example, by performing a layer-of-protection analysis that includes the risk factors from process design, Distributed Control System (DCS), alarm management, Safety Instrumented Systems (SIS) and other equipment (e.g., relief values) to achieve the acceptable risk. After the plant is commissioned, the asset owner is responsible for managing the plant equipment using people and processes that continue to sustain the plant's safety.

In spite of these efforts, process related plant incidents are common. Process Safety Management (PSM) or Operational Integrity is a major issue for the energy industry, with many organizations looking to adopt a more holistic and systematic approach to ensuring the integrity of their operations. While the industry continues to demonstrate success in reducing the incidence of occupational injury and illness, focusing on personnel safety alone is not sufficient and will not prevent serious accidents. Numerous high profile incidents in the last couple of years have heightened the awareness that organizations need to pay more attention to process safety and operational integrity: process safety being a blend of engineering and management skills focused on preventing catastrophic accidents and near hits, particularly, structure collapse, explosions, fires, and damaging releases associated with loss of containment of energy or dangerous substances such as chemicals and petroleum products. These engineering and management skills exceed those required for managing workplace safety as it impacts people, property and the environment. And the consequences of getting process safety wrong have never been higher, with escalating consequences that include:

a) Damage to the people, community, and environment;
b) Corporations or individuals called to account in public including lawsuits;
c) Increased scrutiny by regulators and governments; and
d) Investor confidence undermined, with resulting loss in stock price.

In some cases, even when executives and managers have prioritized process safety or operational integrity, things go wrong. Too often, organizations or individuals make process safety decisions under pressure, or without proper context or sufficient information, even in companies that have a long tradition of making safety a priority. It is important to find the right level of balance so that process safety decisions accurately reflect the company's desired operational risk profile. Though risk can never be eliminated, a variety of mechanisms can be put in place to balance desired safety outcomes with day to day business imperatives and pressures. All too often, too many organizations rely heavily on failure data to monitor performance, so improvements or changes are only determined after something has gone wrong. Often the difference between whether a system failure results in a minor or a catastrophic outcome is purely down to chance. The consequence of this approach is that improvements or changes are only determined after something has gone wrong.

Discovering weaknesses in the quality of the management of the process and control systems by having a major incident is too late and too costly. Early warning of dangerous deterioration within critical systems provides an opportunity to avoid major incidents. Knowing that process risks are effectively controlled has a clear link with business efficiency, as several indicators can be used to show plant availability and optimized operating conditions. Effective management of major hazards requires a proactive approach to risk management, so information to confirm critical systems are operating as intended is essential. Leading indicators can confirm that risk controls continue to be operated is an important step forward in the management of major hazard risks.

A main reason for measuring process safety performance is to provide ongoing assurance that risks are being adequately controlled. Directors and senior managers need to monitor the effectiveness of internal controls against business risks. For major hazard installations and chemical manufacturers, process safety risks will be a significant aspect of business risk, asset integrity, and reputation. Many organizations do not have good information to show how well they are managing major hazard risks. This is because the information gathered tends to be limited to measuring failures, such as incidents or near misses. Those involved in managing process safety risks to ask some fundamental questions about their systems, such as:

a) What can go wrong?
b) What controls are in place to prevent major incidents?
c) What does each control deliver in terms of a 'safety outcome'?
d) How do we know they continue to operate as intended?

Measuring Performance—Early Warning Before Catastrophic Failure

During plant operation, plant systems are modified to adapt to the changing needs to the operation. Systems and procedures can deteriorate over time, and system failures discovered following a major incident frequently surprise senior managers, who sincerely believed that the controls were functioning as designed. Used effectively, process safety indicators can provide an early warning, before catastrophic failure, that critical controls have deteriorated to an unacceptable level. Measuring performance to assess how effectively risks are being controlled is an essential part of a health and safety management system, as explained in successful health and safety management, and, for example, the Chemical Industries Association's Responsible Care Management Systems:
a) active monitoring provides feedback on performance before an accident or incident; whereas
b) reactive monitoring involves identifying and reporting on incidents to check the controls in place are adequate, to identify weaknesses or gaps in control systems and to learn from mistakes.

Leading and Lagging Indicators for Quality of Risk Management

Leading and lagging indicators are set in a structured and systematic way for each critical risk control system within the whole process safety management system. In tandem they act as system guardians providing dual assurance to confirm that the risk control system is operating as intended or providing a warning that problems are starting to develop.

Leading Indicators

Leading indicators are a form of active monitoring focused on a few critical risk control systems to ensure their continued effectiveness. Leading indicators require a routine systematic check that key actions or activities are undertaken as intended. They can be considered as measures of process or inputs essential to deliver the desired safety outcome.

Lagging Indicators

Lagging indicators are a form of reactive monitoring requiring the reporting and investigation of specific incidents and events to discover weaknesses in that system. These incidents or events do not have to result in major damage or injury or even a loss of containment, providing that they represent a failure of a significant control system which guards against or limits the consequences of a major incident. Lagging indicators show when a desired safety outcome has failed, or has not been achieved.

Figure 9:
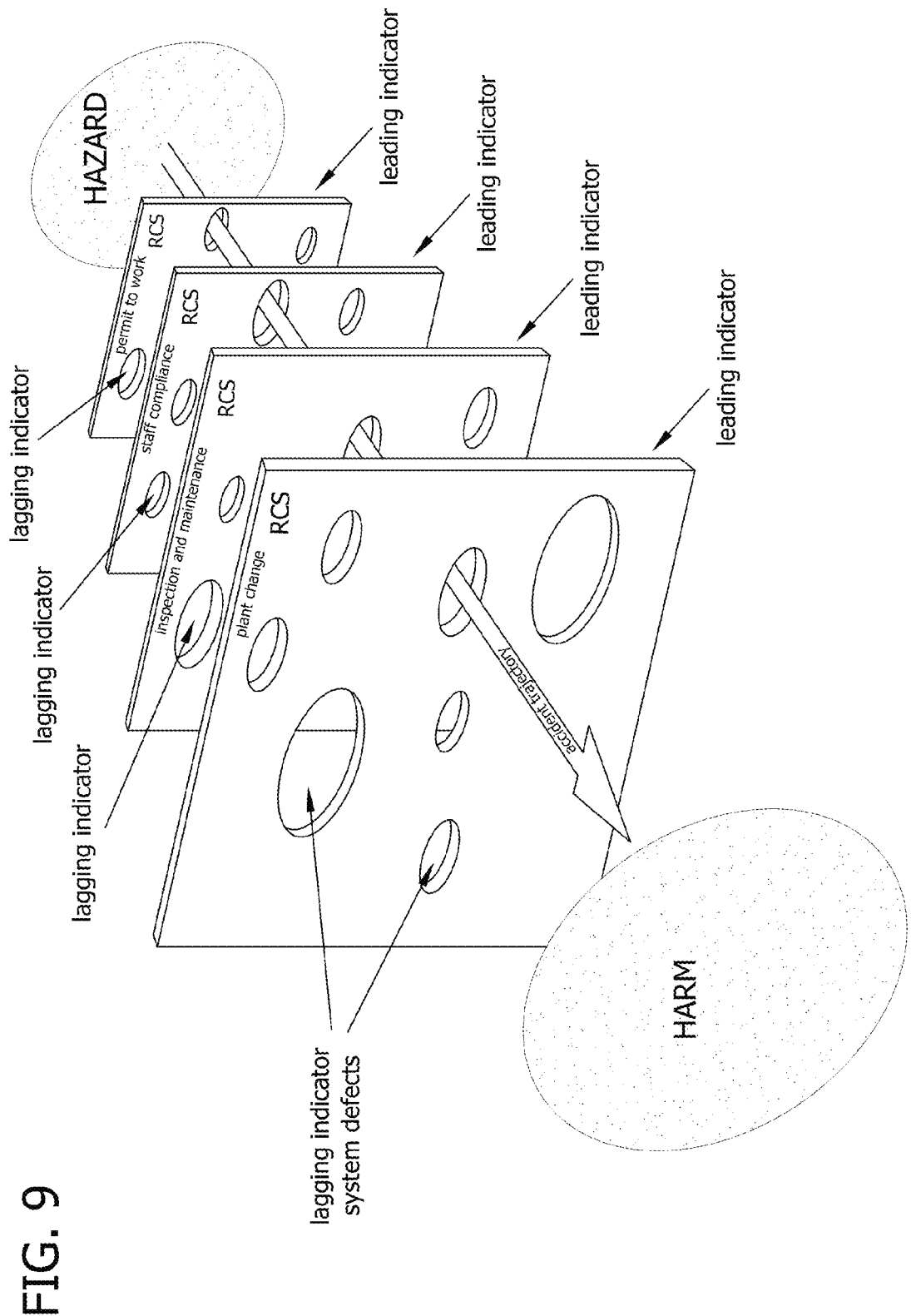
FIG. 9 is a diagram of an accident trajectory model of the prior art with leading and lagging indicators.

According to James Reason in Managing the Risks of Organizational Accidents, (major) accidents result when a series of failings within several critical risk control systems materialize concurrently. FIG. 9 illustrates an example of an 'accident trajectory' model of the prior art where an accident trajectory passes through corresponding holes in the layers of defense, barriers, and safeguards —the 'Swiss Cheese' model. Each risk control system represents an important barrier or safeguard within the process safety management system. It should also be recognized that a significant failing in just one critical barrier may be sufficient in itself to give rise to a major accident.

For each risk control system:
a) the leading indicator identifies failings or 'holes' in vital aspects of the risk control system discovered during routine checks on the operation of a critical activity within the risk control system; and
b) the lagging indicator reveals failings or 'holes' in that barrier discovered following an incident or adverse event (the incident does not necessarily have to result in injury or environmental damage and can be a near miss, precursor event, or undesired outcome attributable to a failing in that risk control system).

If unchecked, all systems will deteriorate over time and major incidents occur when defects across a number of risk control systems materialize concurrently. In effect, the "holes" in the Swiss cheese model become larger. Setting leading and lagging indicators for each risk critical control system should reveal failings in these barriers as they arise and before all the important barriers are defeated.

Solutions

There are a number of organizations/standards bodies that recommend the use of leading and lagging metrics to understand the quality of the process safety management. Some of these are:
a) ISA 84.00.04—Recommended practices for Guidelines for the Implementation of ANSI/ISA-84.00.01-2004 (IEC 61511 Mod);
b) CCPS (Centre for Chemical Process Safety); and
c) Energy Institute; and
d) Health and Safety Executive; and
e) International Association of Oil and Gas Producers The common theme of these metrics is the use of Key Performance Indicators (KPIs) generated from the management of the process/functional safety equipment and the people and processes that are used in terms of their competence, leadership and risk management. For example, the Energy Institute has published a Process Safety Management framework, developed by the energy industry, for use by various industry sectors. The framework is intended to be applicable worldwide, to all sectors of the industry such as power, petroleum, chemicals, refining etc. The framework encapsulates learning from people with practical experience of developing and implementing Process Safety Management as part of an integrated management system. It clearly sets out what needs to be done to assure the integrity of the operation and helps define what measures should be in place and how they are performing.

The framework consists of three levels: Focus Area, Elements, and Expectations. The Focus Area sets out the high level components of the PSM framework. Within each of the focus areas are a number of Elements which set out the key aspects of the operation that organizations need to get right in order to ensure their integrity. Each element contains Expectations that define what organizations need to get right in order to meet the intent of each element. The four focus areas are split into:
a) Process Safety Leadership
b) Risk identification and assessment
c) Risk Management
d) Review and Improvement It is not intended to replace existing process safety or health, safety, and environmental (HS&E) management systems. Where an organization has an existing HS&E system or PSM system, it may be useful to benchmark against the framework or carry out a risk assessment versus the expectations of each element in order to identify any aspects of the existing system that may need to be enhanced.

Safety Performance Indicator

After a set of KPIs have been adopted, an asset owner management is responsible for monitoring these KPIs and responding to deviations for their baselines. In the higher management levels, the relevance of the KPIs associated with the management of the equipment in a plant, can be lost. It becomes therefore necessary to translate the individual equipment level KPIs and their business impact into plant level KPIs and their business impact—and further the upper management is responsible for the quality of process safety management for a number of plants spread across a number geographic regions. Aspects of the present invention have taken the KPIs and developed an approach to allow an asset owner to understand the overall safety state of the plant and the impact on business. In addition, this approach is tied to the existing Layer of Protection Analysis (LOPA) and financial impact analysis.

KPI metrics are gathered based on the asset owner's management of the plant equipment, the capability of the people and the processes followed to manage process safety. Ten to twenty key metrics can cover management of safety related equipment (e.g., completion of field device periodic proof tests associated with a distillation column); competence of people (e.g., training); adherence to established procedures (e.g., near miss investigations); and leadership (e.g., involvement of leadership in safety reviews). These metrics can originate from the management of the layers of protection associated with the different lines of equipment from at a LOPA level (e.g., SIS) or at the line of equipment level (e.g., leadership).

Figure 10:
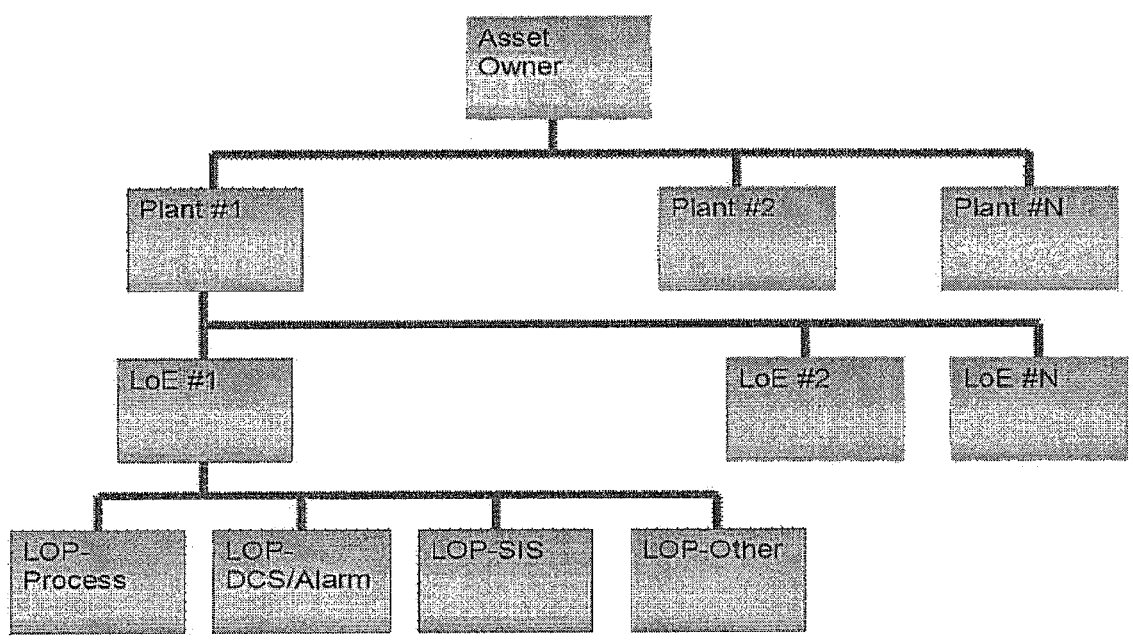
FIG. 10 is an asset owner safety model of one embodiment of the invention.

The Safety Performance Indicator (SPI) is an aggregation of the KPIs into a single number. The Safety Performance Indicator can be calculated at the equipment level (equipment SPI) and at the plant level (plant SPI). FIG. 10 shows the asset owner safety model of their global assets. These consist of plants distributed over geographic regions. A plant is decomposed into lines of equipment. The lines of equipment have layers of protection associated with them.

One example of a system for assessing risk of an operation of a user includes a storage device; an input interface for defining key performance indicators (KPIs) from the user stored in the storage device and indicative of a risk measurement of the operation; an interface for monitoring the defined KPIs and for receiving KPI information corresponding to the monitored KPIs; a rules engine of computer executable instructions stored in the storage device, said rules engine for defining a safety performance indicator (SPI) based on the received KPI information; a processor connected to the storage device and executing the rules engine instructions for determining the SPI; and an SPI output interface connected to the processor and indicating the determined SPI for the operation.

Figure 11:
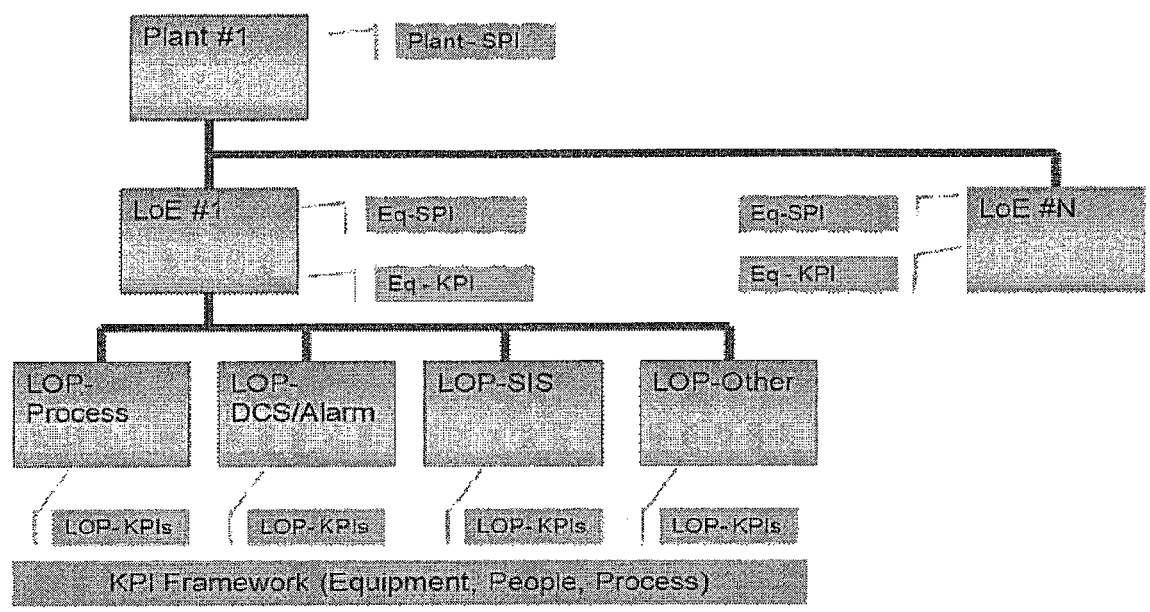
FIG. 11 is a plant safety model of one embodiment of the invention.

FIG. 11 shows the plant safety model. Underlying the model is a safety related KPI framework which address the management of the process safety related to plant equipment, the processes used to manage these and the capabilities of the people who apply the process.

Calculate Weighted KPI of a Layer of Protection

The KPI for a layer of protection can be calculated as follows:

$$KPI\_LOP_j = \frac{e^{\sum_i^{K_j}(w_i * KPI_i)}}{e^{\sum_i^{K}(w_i)}}$$

Where
KPI_LOP=weighted average KPI of a layer of protection
w=weight of a KPI
KPI=key performance indicator related to plant, process, people as applicable.
Note: weight of 0 signifies KPI is not used
K=number of KPIs for a LOP
i=index counts number of KPIs
j=index counts number of LOPs
Calculate Safety Performance Index for an Equipment
Consider that equipment has a number of layers of protection. From a safety perspective, layers of protection are of different importance/risk level. From the LOP analysis, each layer of protection has associated with it a risk reduction factor. The weighted KPIs associated with the equipment can be aggregated and weighted using the risk reduction factor associated with the LOP.

$$SPI\_EQUIP_j = \frac{\sum_i^{L_j} w_{lop_i} * KPI_{LOP_i}}{\sum_i^L w_i} = \frac{\sum_i^{L_j} rrf_i * KPI_{LOP_i}}{\sum_i^L w_i}$$

L=number of layers of Protection
w_lop=weight for a layer of protection=Risk Reduction Factor (RRF) for the layer of protection
i=index for counting layers of protection
j=index for counting number of equipment
Calculate Safety Performance Index for a Plant
Consider that a plant has a number of lines of equipment. From a safety perspective, lines of equipment are of different importance/risk level. From the LOP analysis, each line of equipment has associated with it a total equipment risk. The Safety performance indicators for the lines of equipment can be aggregated using the total risk factor calculated from the LOP analysis.

$$SPI\_PLANT = \frac{\sum_i^E \frac{1}{EQ_{RISK_i}} * SPI_{EQUIP_i}}{\sum_i^E \frac{1}{EQ_{RISK_i}}}$$

E=number of equipment in a plant
I=index used to count the equipment in the plant
EQ_RISK=total mitigated risk for the equipment (sum of all the mitigated risks for an equipment)
SPI_PLANT=SPI for the plant
Calculate the Estimated Financial Line of Equipment Risk and Plant Based on the Safety Performance indicator, a safety performance state can be calculated. For example, the safety performance indicator can have ranges such as good (>95%), warning (90 to 95%); bad (<90%). Associated with each line of equipment is an asset impact. For example, the asset impact may be defined as S0 to S5 as shown below.

| Level | Asset Loss Value | Production Loss |
|---|---|---|
| S0 | $ 10,000 | 0 bbls |
| S1 | $ 100,000 | 1000 bbls |
| S2 | $ 1,000,000 | 5000 bbls |
| S3 | $ 10,000,000 | 15,000 bbls |
| S4 | $ 100,000,000 | 50,000 bbls |
| S5 | $1,000,000,000 | 100,000 bbls |

Incremental estimated asset value at risk is a safety performance adjusted metric (expected value) that can be calculated using the safety performance Indicator, the safety performance state and the asset impact. For example, the incremental asset-value-at-risk can be estimate as follows: 100% of the asset loss value if the safety performance state is "bad"; 50% of the asset value at risk if the safety performance state is "warning"; 0% of the asset loss value if the safety performance state is "good".

Line of Equipment Esimated Incremental Asset Value at Risk =

$$\begin{cases} 0 \text{ if } SPI > 95\% \\ 0.5 * \text{defined asset impact if } SPI \geq 90\% \text{ and } \leq 95\% \\ 1.0 * \text{defined asset impact if } SPI < 90\% \end{cases}$$

The plant level incremental asset value at risk can be estimated by adding the estimated incremental asset value at risk for the lines of equipment in the plant. The plant level incremental production at risk can be estimated by adding the incremental production at risk for the underlying lines of equipment.

Plant: Estimated Incremental Asset Value at Risk =

$$\sum LOE \text{ incremental asset value at risk}$$

Plant: Esimated Incremental Production Capacity at Risk =

$$\begin{cases} 0 \text{ if Plant } SPI > 95\% \\ 0.5 * \text{defined production capacity if Plant } SPI \geq 90\% \text{ and } \leq 95\% \\ 1.0 * \text{defined production capacity if Plant } SPI < 90\% \end{cases}$$

For a corporation with many plants, the incremental asset value at risk and the product at risk can be aggregated.

Corporation: Estimated Incremental Asset Value at Risk =

$$\sum \text{Plant incremental asset value at risk}$$

Corporation: Estimated Incremental Production Capacity at Risk =

$$\sum \text{Plant incremental asset value at risk}$$

Dashboards

Figure 13:
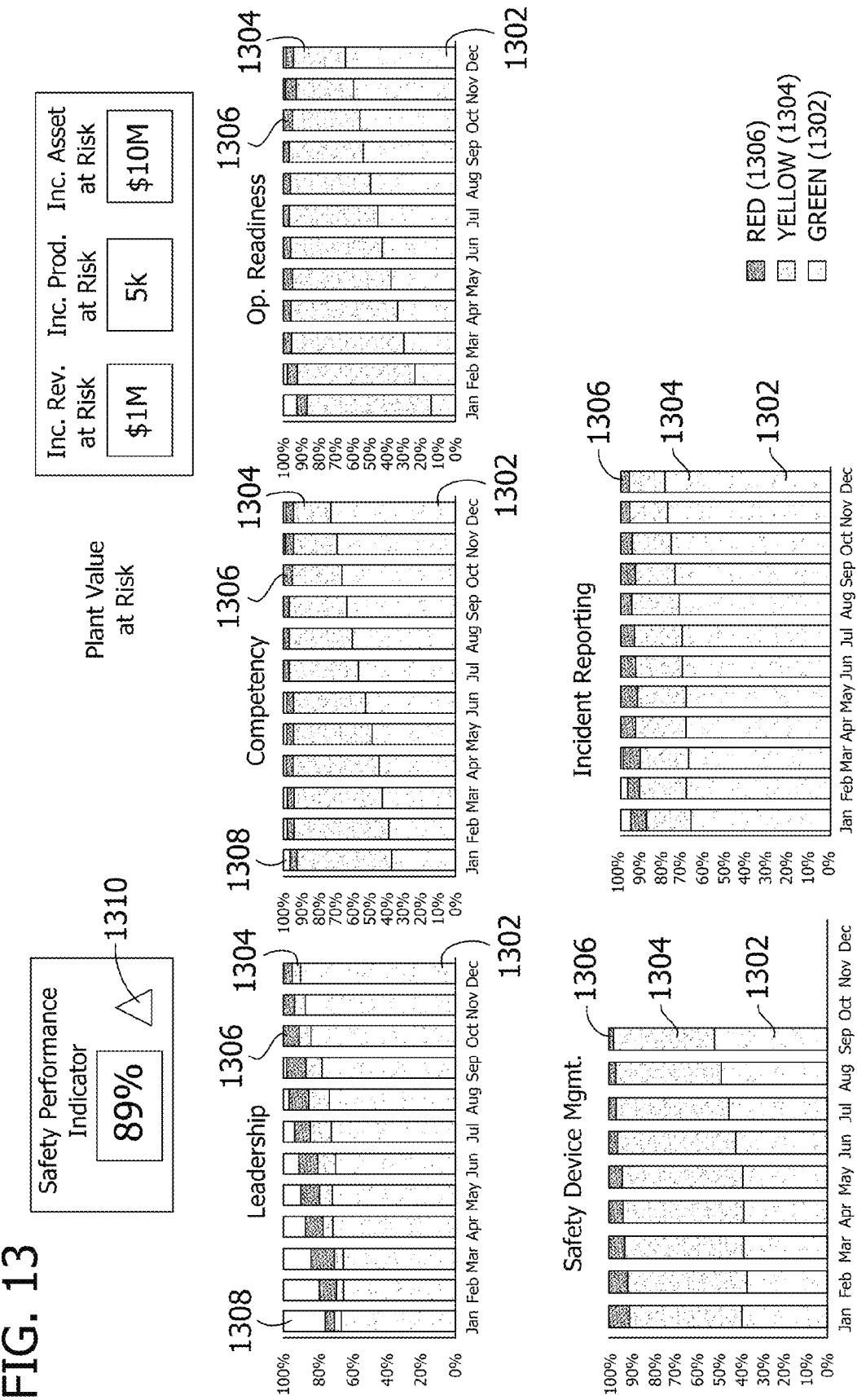
FIG. 13 is an exemplary plant level dashboard of one embodiment of the invention.

To display the safety performance index and related incremental asset value at risk and incremental production loss, the following dash boards are envisioned. The plant level dash board could display the plant level safety performance data and provide drill down capability to underlying KPIs. FIG. 12 illustrates an example of a corporate dashboard embodying aspects of the invention. FIG. 13 illustrates an example of a plant level dashboard embodying aspects of the invention to illustrate the plant value at risk. FIG. 13 illustrates bar graphs for each month along the x-axis to indicate leadership, competency, operational readiness, safety device management and incident reporting. The bar graphs range along the y-axis from 0% at the bottom to 100% at the top based on the various parameters as noted herein. Each bar graph is shaded to illustrate the percentage of indicators for each month which are acceptable (dark gray shading 1302; green), indicators which could be problematic (light gray shading 1304; yellow) and indicators which are unacceptable (black shading 1306; red). Some bar graphs 1308 are less than 100% because of insufficient data. The top left of the dashboard presents a safety performance indicator based on the parameters. In this example, the overall indicator is 89% and an upwardly pointing green arrow 1310 indicates that the safety performance is improving. The top right of the dashboard presents the incremental revenue at risk ($1 M), the incremental production at risk (5 k) and the incremental assets at risk ($10 M) based on the parameters.

SUMMARY

The following summarizes one example of steps to performance measurement:
  Step 1: Establish the organizational arrangements to implement indicators
  Step 2: Decide on the scope of the indicators
  Step 3: Identify the risk control systems corresponding to the indictors and decide on the outcomes
  Step 4: Identify critical elements of each risk control system
  Step 5: Establish data collection and reporting system
  Step 6: Review (benchmark against the environment impact (EI) PSM Framework or equivalent)
  Step 7: Deploy KPI model and SPI
  Step 8: Establish Management Role and actions for review of KPI, SPI, estimated asset-at-risk and estimated production-at-risk.

The above may be implement as a system for assessing risk of an operation including a storage device, a rules engine of computer executable instructions determining a safety risk measurement stored in the storage device, and a processor connected to the storage device and executing the rules engine instructions for determining a safety risk measurement by executing instructions stored in the storage device. The instructions comprise instructions for:
  Establishing the organizational arrangements of the operation to implement indicators;
  Specifying a scope of the indicators;
  Identifying a risk control system corresponding to the indicators and its outcomes;
  Identifying critical elements of the risk control system;
  Establishing a data collection and reporting system of the critical elements;
  Reviewing the critical elements compared to a benchmark; and
  Determining a key performance indicator (KPI) model and a safety performance; and indicator (SPI) based on the determined KPI model.

The Abstract and summary are provided to help the reader quickly ascertain the nature of the technical disclosure. They are submitted with the understanding that they will not be used to interpret or limit the scope or meaning of the claims. The summary is provided to introduce a selection of concepts in simplified form that are further described in the Detailed Description. The summary is not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of the computer, and are executed by the data processor 708(s) of the computer.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, hand-held or laptop devices, multiprocessor 708 systems, microprocessor 708-based systems, set top boxes, programmable consumer electronics, mobile telephones, network PCs, minicomputers, mainframe computers, distributed computing environments that include any of the above systems or devices, and the like.

Embodiments of the invention may be described in the general context of data and/or computer-executable instructions, such as program modules, stored one or more tangible computer storage media and executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage device 704.

In operation, computers and/or servers may execute the computer-executable instructions such as those illustrated herein to implement aspects of the invention.

Embodiments of the invention may be implemented with computer-executable instructions. The computer-executable instructions may be organized into one or more computer-executable components or modules on a tangible computer readable storage medium. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the invention by way of example and not by way of limitation. This description enables one skilled in the art to make and use the invention, and describes several embodiments, adaptations, variations, alternatives and uses of the invention, including what is presently believed to be the best mode of carrying out the invention. Additionally, it is to be understood that the invention is not limited in its application to the details of construction and the arrangement of components set forth in the following description or illustrated in the drawings. The invention is capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A system for assessing risk of an operation of a user comprising:
   a storage device;
   an operational safety risk input interface for receiving operational safety risk information from the user or from other systems of the operation, said operational safety risk information stored in the storage device and indicative of an operational safety risk measurement of the operation;
   a conditional safety risk input interface for receiving conditional safety risk information from the user or from other systems of the operation, said conditional safety risk information stored in the storage device and indicative of a conditional safety risk measurement of the operation;
   a rules engine of computer executable instructions stored in the storage device, said rules engine for determining at least one of an operational safety risk measurement for the operation as a function of the operational safety risk measurement information stored in the storage device and a conditional safety risk measurement for the operation as a function of the conditional safety risk measurement information stored in the storage device;
   a processor connected to the storage device and executing the rules engine instructions for determining a safety risk analysis measurement based on at least one of the determined operational safety risk measurement for the operation and the determined conditional safety risk measurement for the operation;
   a safety risk analysis measurement output interface connected to the processor and indicating the determined safety risk analysis measurement for the operation; and
   a safety risk variables input module for indicating a status of variables that impact safety risk, said variables including at least one of life of equipment, maintenance level of equipment and inspection rigor.

2. The system of claim 1 further comprising a conditional safety risk work flow monitor input for monitoring a potential safety condition, identifying when the monitored condition is outside a given range and initiating at least one of a corrective action, a notice to an operator of the situation and an indication to an operator action to be taken.

3. The system of claim 1 further comprising:
a notification module of computer executable instructions executed by the processor to notify an operator of a situation, a condition or safety risk analysis measurement for the operation; and
an action rules engine of computer executable instructions stored in the storage device, said action rules engine for selectively activating the notification module in response to the determined safety risk analysis measurement for the operation.

4. The system of claim 3 wherein the notification module provides at least one of a text, an email, or other electronic message to an operator as a notification.

5. The system of claim 1 further comprising:
a workflow trigger/corrective action module of computer executable instructions executed by the processor for triggering workflows in response to the safety risk analysis measurement to notify and guide a compliance process or to keep an operator informed via the safety risk analysis measurement output interface whereby the operator is aware when processes are correctly followed or when there may be a safety issue; and
an action rules engine of computer executable instructions stored in the storage device, said action rules engine for selectively activating the action module in response to the determined safety risk analysis measurement for the operation.

6. The system of claim 5 wherein the workflow is triggered when a safety risk analysis measurement is outside a preset range.

7. The system of claim 1 wherein the safety risk analysis measurement is a weighted composite which is a function of the operational safety risk measurement information stored in the storage device or as a function of the conditional safety risk measurement information stored in the storage device.

8. The system of claim 1 wherein the processor determines the safety risk analysis measurement for the operation according to the following:

$$SR=w_1*OSR+w_2*CSR$$

wherein SR is the safety risk analysis measurement, $w_1$ and $w_2$ are weighting factors, OSR is an operational safety risk determined by the processor based on the received operational safety risk information and CSR is a conditional safety risk determined by the processor based on the received conditional safety risk information.

9. The system of claim 1 wherein the processor determines the safety risk analysis measurement for the operation according to the following:

$$SR=OSR+CSR$$

wherein SR is the safety risk analysis measurement, OSR is an operational safety risk determined by the processor based on the received operational safety risk information and CSR is a conditional safety risk determined by the processor based on the received conditional safety risk information.

10. The system of claim 1 wherein the processor determines the safety risk analysis measurement for the operation according to the following:

$$SR=MAX\{OSR, CSR\}$$

wherein SR is the safety risk analysis measurement, OSR is an operational safety risk determined by the processor based on the received operational safety risk information, and CSR is a conditional safety risk determined by the processor based on the received conditional safety risk information whereby the SR is the maximum of the OSR or the CSR.

11. The system of claim 1 wherein the processor determines the safety risk analysis measurement for the operation according to the following:

$$SR=MAX\{w_1*OSR, w_2*CSR\}$$

wherein SR is the safety risk analysis measurement, $w_1$ and $w_2$ are weighting factors, OSR is an operational safety risk determined by the processor based on the received operational safety risk information and CSR is a conditional safety risk determined by the processor based on the received conditional safety risk information whereby the SR is the maximum of the $w_1*OSR$ or the $w_2*CSR$.

12. A computerized method for assessing risk of an operation of a user comprising executing computer executable instructions stored in a memory, said instructions:
receiving operational safety risk information from the user or from other systems of the operation, said operational safety risk information stored in the storage device and indicative of an operational safety risk measurement of the operation;
receiving conditional safety risk information from the user or from other systems of the operation, said conditional safety risk information stored in the storage device and indicative of a conditional safety risk measurement of the operation;
determining at least one of an operational safety risk measurement for the operation as a function of the operational safety risk measurement information stored in the storage device and a conditional safety risk measurement for the operation as a function of the conditional safety risk measurement information stored in the storage device;
determining a safety risk analysis measurement based on the determined operational safety risk measurement for the operation and based on the determined conditional safety risk measurement for the operation;
indicating the determined safety risk analysis measurement for the operation; and
indicating a status of variables that impact safety risk, said variables including at least one of life of equipment, maintenance level of equipment and inspection rigor.

13. The method of claim 12 further comprising:
notifying an operator of a situation, a condition or safety risk analysis measurement for the operation; and
selectively activating the notifying in response to the determined safety risk analysis measurement for the operation.

14. The method of claim 13 wherein the notifying comprises at least one of providing a text, an email, or other electronic message to an operation as a notification.

15. The method of claim 12 further comprising:
triggering workflows in response to the safety risk analysis measurement to notify and guide a compliance process or to keep an operator informed via the safety risk analysis measurement output interface whereby the operator is aware when processes are correctly followed or when there may be a safety issue; and selectively activating the triggering in response to the determined safety risk analysis measurement for the operation.

16. The method of claim 15 wherein a workflow is triggered when a safety risk analysis measurement is outside a preset range.

17. The method of claim 12 wherein the safety risk analysis measurement is a weighted composite which is a function of the operational safety risk measurement information stored in the storage device or as a function of the conditional safety risk measurement information stored in the storage device.

18. A system for assessing risk of an operation of a user comprising:
   a storage device;
   an input interface for defining key performance indicators (KPIs) from the user, said KPIs stored in the storage device and indicative of a risk measurement of the operation;
   an interface for monitoring the defined KPIs and for receiving KPI information corresponding to the monitored KPIs;
   a rules engine of computer executable instructions stored in the storage device, said rules engine for defining a safety performance indicator (SPI) based on the received KPI information;
   a processor connected to the storage device and executing the rules engine instructions for determining the SPI;
   an SPI output interface connected to the processor and indicating the determined SPI for the operation; and
   wherein at least one of the following:
      equipment of the operation has a number of layers of protection, wherein each layer of protection has associated with it a risk reduction factor and wherein key performance indicators (KPIs) are associated with each equipment and are aggregated and weighted using the risk reduction factor associated with a layer of protection (LOP) of each equipment; and
      the operation has a number of lines of equipment, wherein each line of equipment has associated with it a total equipment risk and wherein safety performance indicators (SPIs) are associated with each of the lines of equipment and are aggregated using a total risk factor calculated from a layer of protection (LOP) analysis of each line of equipment.

19. The system of claim 18 wherein the KPI for a layer of protection is calculated as follows:

$$KPI\_LOP_j = \frac{e^{\sum_i^{K_j}(w_i * KPI_i)}}{e^{\sum_i^{K}(w_i)}}$$

Where
KPI_LOP=weighted average KPI of a layer of protection;
w=weight of a KPI;
KPI=key performance indicator related to plant, process, people as applicable;
K=number of KPIs for a LOP;
i=index counts number of KPIs;
j=index counts number of LOPs.

20. The system of claim 19 wherein the equipment of the operation has a number of layers of protection, wherein each layer of protection has associated with it a risk reduction factor and wherein key performance indicators (KPIs) are associated with each equipment and are aggregated and weighted using the risk reduction factor associated with a layer of protection (LOP) of each equipment.

21. The system of claim 19 wherein the operation has a number of lines of equipment, wherein each line of equipment has associated with it a total equipment risk and wherein safety performance indicators (SPIs) are associated with each of the lines of equipment and are aggregated using a total risk factor calculated from a layer of protection (LOP) analysis of each line of equipment.

* * * * *